and like parts are indicated by the same numeral.

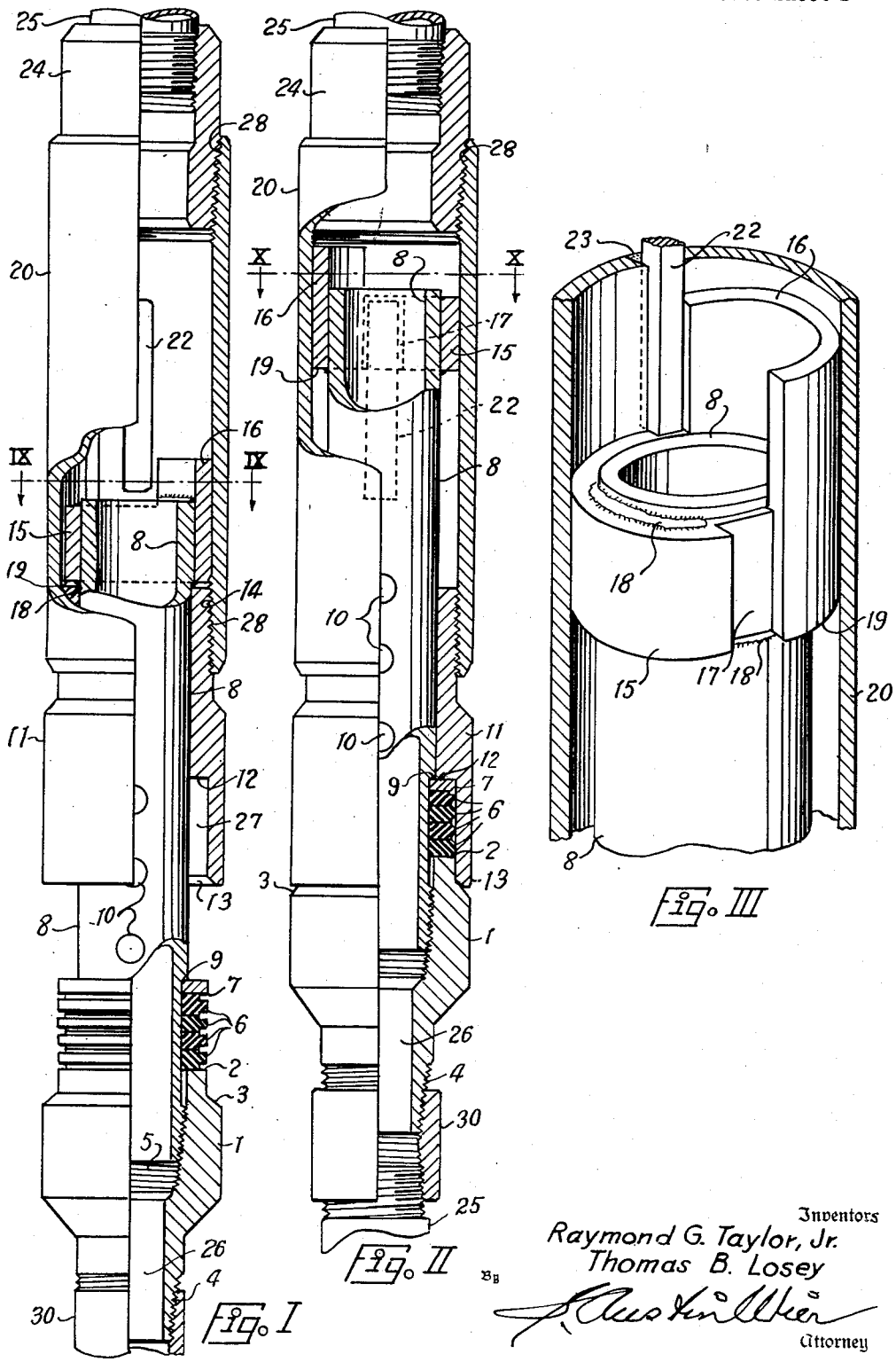

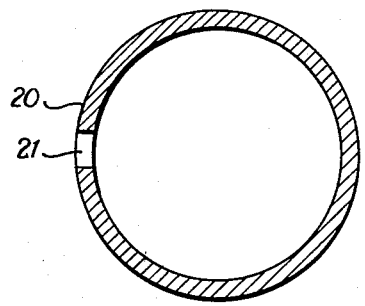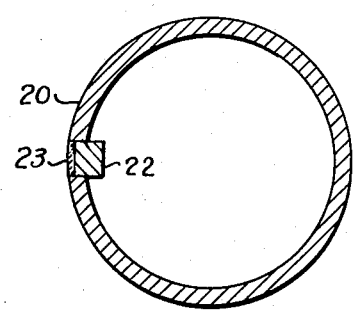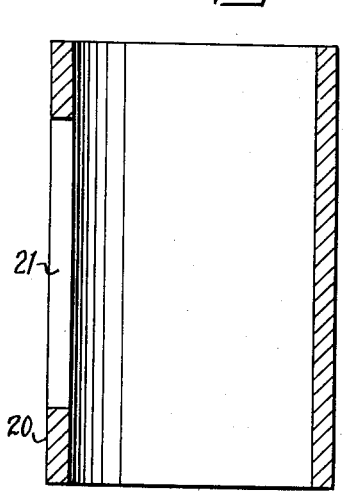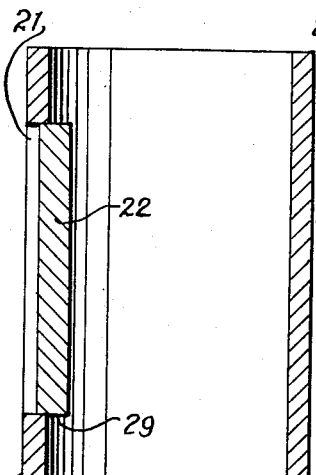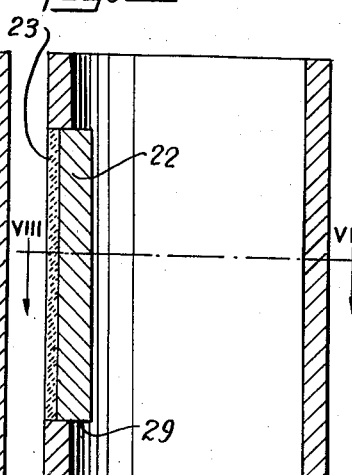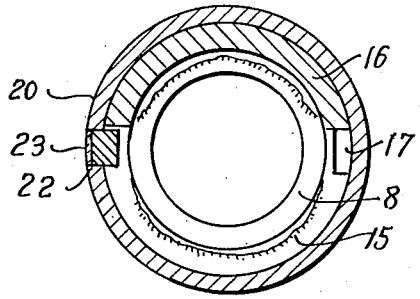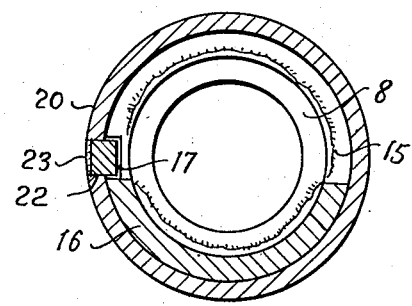

United States Patent Office 2,693,974
Patented Nov. 9, 1954

2,693,974

WELL VALVE

Raymond G. Taylor, Jr., and Thomas B. Losey, Dallas, Tex., assignors to The Guiberson Corporation, Dallas, Tex., a corporation of Delaware Application June 23, 1947, Serial No. 756,390

5 Claims. (Cl. 287—103)

This invention has to do with well valves and valve locking mechanism. It particularly concerns telescopic members forming parts of a slidable valve which may be securely maintained in open position by reason of a special locking device forming an important part of this invention. This locking device will prevent or allow longitudinal movement as desired between telescoping tubes and will prevent their separate rotation; and it is unusually strong and safe and dependable notwithstanding that it is comparatively easy to manufacture and simple to operate.

The valve and the locking mechanism here disclosed may be used in many oil field operations to great advantage. It is particularly useful in circulating fluid between well tubing and well casing; and it constitutes a most valuable tool for use with well packing apparatus.

It is frequently of the greatest importance to have a valve stand open on a string of tubing while it is being run into the well; and it is often vitally necessary that such a valve be positively locked in such open position while being thus run into the well.

While running a string of tubing into a well with valve open in the tubing, the sudden closure of this valve will necessarily and immediately result in tremendous and undesired pressures building up in the casing below the valve or packing elements. Frequently such pressures exert sufficient force to distort the tubing, or to dislodge packers, or to rupture cement holding the casing in place. These are highly undesirable results.

A safe and dependable locking mechanism to be used with a valve of the character here disclosed is a most desirable thing indeed; and this invention offers it.

One of the important objects of this invention is to provide continuously dependable locking mechanism, as a part of the valve assembly here disclosed, and at unusually low costs in manufacture. The simplicity, ease and cheapness with which this mechanism can be manufactured is of great importance; and the sturdiness and strength of the locking mechanism in use, both arising by reason of our peculiar manner of construction and assembly, are of equal importance and advantage.

While, as has been stated, it is of vast importance that a dependable locking mechanism be provided so that the valve will always and safely remain wide open while being introduced into the well, there comes a time in the operation of the well when it is vitally necessary that the valve itself be not only closed, but that it be closed with such certainty as to seal absolutely against the passage of fluids under great and severe pressures. This invention supplies exactly that need.

The sealing mechanism of the valve is of such positive character that there will be no leak through the valve; and among the important objects realized by this invention is: Dual sealing means in the valve.

The valve is provided with a beveled valve seat and its complementary beveled head which together form one sealing means; and the long tubular mandrel carries the head which it guides into perfect alignment and mating with the seat. The true seating of the valve is therefore made much more certain by the guiding effect of the straight long mandrel within its telescoping coupling.

The other sealing means is found in a series of resilient rings constituting a valve sleeve. This sleeve is expanded under pressure until it seals tightly against the inner walls of the main valve seat body. The valve is so constructed and proportioned that the beveled valve seat may not contact its complementary head without causing the vertical compression of the valve sleeve and forcing its lateral expansion to establish a series of perfect seals preventing passage of any fluid through the closed valve. Thus we provide two separate and distinct means of sealing our valve.

Therefore, if any kind of foreign materials, such as small metal parts, rope, packing material, rock or gravel were to become lodged on the beveled metal-to-metal faces of the valve, preventing their final and accurate closing, the body of this valve would nevertheless be tightly sealed against the passage of fluid. This is so because of the expansion of the resilient valve sleeve. The compression of the sleeve, which results in its lateral expansion, commences somewhat before these metal-to-metal faces come into contact. Such an operation is inherent in the design and construction of this invention.

Positive locking when the valve is open and positive sealing when the valve is closed are very important factors of this invention.

Other objects of this invention will become apparent upon further consideration of the specification, the drawings and the claims. Various modifications may be made in the structure and operation of this invention without in the least departing from the spirit thereof as disclosed herein.

In the drawings:

Fig. I discloses a partially sectionalized elevation of a typical valve assembly with the valve locked in open position.

Fig. II discloses the device shown in Fig. I with the valve in closed and sealed position.

Fig. III is a perspective view of sections of the main parts of the valve locking mechanism.

Fig. IV is a plan view of a section of the spline coupling taken in the region of the spline slot.

Fig. V is a sectionalized elevation of the section of coupling shown in Fig. IV.

Fig. VI is the same as Fig. V except that the spline has been inserted in its slot.

Fig. VII is the same as Fig. VI except that the spline has been welded in place.

Fig. VIII is a plan view of the elements shown in Fig. VII and taken along the line VIII—VIII thereof.

Fig. IX is a plan view taken across line IX—IX of Fig. I.

Fig. X is a plan view taken across line X—X of Fig. II.

Referring now to the drawings in greater detail, it will be observed that the various parts and elements of the devices there disclosed have been indicated by numerals; and like parts are indicated by the same numeral.

The numeral 1 indicates the valve head body, which is made hollow; and it is attached to tubular mandrel 8, so that it will move therewith when the latter is telescoped into the hollow valve seat body 11. Figures I and II make plain that the valve is opened and closed by the sliding together, or apart, of the members just indicated.

On the valve head body there is provided a flat shoulder 2, constituting the upper face of that body. Below this shoulder, and on an enlarged outer part of the valve head body, there is provided the beveled face 3 of the valve head.

The lower part of the valve head body is connected to tubing 25 by the use of any appropriate means of connection; and for this purpose threads 4 have been indicated as male threads on the outside of the valve head. A pipe collar 30 may be employed to unite casing 25 and member 1.

Female threads 5 may be provided within the upper part of the valve head to receive the threaded end of mandrel 8, so that these two members may be made up into a very tight connection. Removable means of attachment is best used.

Resting on the shoulder 2 there is provided a series of valve sleeve rings 6; and any reasonable number of these may be used. Usually four such elements are sufficient to make up a valve sleeve of suitable length. Of course, all four of these valve sleeve elements could be made together as one member; but it has been found very practical to make them as separate members, so that others may be added as needed; and so that their number may be reduced, if desired.

The valve sleeve rings should be made of resilient material, preferably rubber or rubber composition; and this may be reinforced. These rings should be thicker in the region of their immediate contact, one with the other; and they should be tapered off or made more thin near their extreme outer peripheries, so as to provide each with a finger-like lateral extension from the main body of the sleeve ring. See the construction indicated in Figures I and II. The purpose of such construction, and the reason for the resilient and compressible character of the material used in making these sleeve rings will become apparent as this specification is developed.

The rings 6, constituting the valve sleeve, will lie snugly around the mandrel 8 and immediately above the valve head body 1. In order to keep them in this position there has been provided a valve sleeve retainer 7, which may be a metallic ring, or some other hard material, having a smoothly finished upper and lower face, the latter to rest upon the uppermost ring 6 of the sleeve; and the upper face of the retainer 7 will ultimately come in contact with the flat shoulder 12 of the valve seat body 11.

In order to keep the valve sleeve rings 6 and the valve sleeve retainer 7 in their properly related positions, and close to the upper face 2 of valve head body 1, there should be provided around the outer surface of mandrel 8 a slight shoulder 9. Such shoulder may be provided by cutting off the outer face of the mandrel 8 below such shoulder line; and such cut should be of very light character. It is only necessary that the cut be sufficient to allow retainer 7 and rings 6 to be slipped over the lower threaded end of mandrel 8 (before assembly); and it must be deep enough to prevent the passage upward of the sleeve retainer 7 beyond the cut, that is beyond shoulder 9.

A series of valve ports 10, may be made in the side wall of the mandrel at any suitable location. They simply constitute openings through the wall of the mandrel for the passage of fluid, to and fro, as the valve is operated and as the tubing carrying the valve may be raised or lowered, or otherwise manipulated within the bore of the well, or within the casing carried in the bore of the well.

The ports 10 are made through the walls of the mandrel 8 at some points above the shoulder 9 and at some points below the shoulder 12, as these shoulders are positioned when the valve is fully open and the telescope most extended. Location of the ports in such region will allow the maximum flow of fluids therethrough. The size is largely a matter of choice. The flow capacity and requirements of any such valve are easily determined; and the size of openings is then fixed.

The valve seat body 11 is a hollow member having a bore therethrough sufficiently large to accommodate the passage of mandrel 8; and in the lower part of the valve seat body 11 there is provided an enlarged bore 27, to receive and accommodate sealing means 6, carried on the upper end of valve head body 1.

The lower end of the wall of the enlarged bore 27 of the valve seat body 11 has been finished with a well machined and highly polished beveled face 13, designed and constructed to become a complement to the externally beveled face 3 on the member 1, so that when these beveled faces come together they will make a perfectly even and satisfactory metal-to-metal sealing contact between the upper and lower valve body members 11 and 1 of the body of the valve. This may be regarded as the primary sealing means employed in the closing of this valve; but there are other sealing means.

When the assembly of tubing, carrying our invention of a slidable, dual sealing, and locked valve, is lowered into a well, it is lowered with the valve wide open, and locked in that position. This is desirable so that fluid displaced by the descending tubing may be allowed to flow freely from within the casing (not shown but surrounding the tubing in the ordinary manner) through the ports 10 and into the tubing and upward and outward therefrom, at the ground level.

In order to put into operation the second sealing means in this valve, it is necessary to close the valve by lowering the tubing 25 at the upper end of Fig. 1, after unlocking the valve. This puts the telescopic members of the valve assembly into their shortest compass, and closes the valve.

When the tubing is lowered, the member 11 will telescope over the upper end of member 1, including in the operation the encasement of the rings 6 and 7. The steps in this operation are further described immediately hereinafter. The primary contact made between the lower assembly of the valve head 1 and the upper assembly of the valve seat 11 will be the contact between valve sleeve retainer 7 and shoulder 12; and such contact will in itself make a seal; but a much more effective seal results after the telescoping progresses further and continues until the beveled face 13 of body 11 rests firmly on the beveled face 3 of body 1. The contact between these faces makes a very good and lasting seal (unless some foreign substance should become lodged on these faces to prevent their absolute closure).

However, when these faces come together another and never failing seal has also been put into operation. That is the secondary seal between the outer peripheral surfaces or fingers of valve sleeve rings 6 and the inner face of the enlarged bore 27, against which they are made to impinge most tightly.

At this stage in the sealing of this valve the shoulder 12 will have forced valve sleeve retainer ring 7 down below its normal position at shoulder 9; and, as it is forced downwardly, it compresses the resilient rings 6 so that they expand laterally to a considerable extent. The outer face of each such ring will make a separate seal against the confining wall of body 11; and there will be a space between the peripheral fingers or extensions of rings 6, as disclosed in Fig. I. Such construction of spaced extension on the rings 6 will further increase the effectiveness of the seal of the valve sleeve. The resulting seal is sufficient by itself to prevent the passage of any fluid through the ports 10, regardless of pressure encountered.

However, in normal operation, the resilient seals of members 6 and the seal of the beveled faces 3 and 13 jointly resist the passage of fluids, to make this in truth a duplex sealing valve.

The valve seat body is carried by a coupling member provided with a locking spline 22. Means for removably connecting the hollow valve seat body 11 to spline coupling 20 may be any means found effective for the purpose; but it is recommended that male threads 14 be provided on the upper end of the body 11, and that female threads 28 be provided in the lower end of the coupling 20.

The important valve locking mechanism will be next described. The upper end of mandrel 8 is provided with a locking ring 15; and this ring may be affixed to the mandrel by the use of welding 18, or by any other dependable means. These two members could be made integral.

Locking ring 15, surmounting the mandrel 8, as a circle thereabout, is provided with an elevated or extended projection thereabove to form lock stop 16; and when seen from above this lock stop will have a semicircular appearance, as will the remaining part of ring 15; and each such semi-circle will occupy approximately 180 degrees of space.

Of course, it is entirely possible and practical to have the lock stop 16 encompass more or less than 180 degrees of the circle, with the lowered face of the locking ring 15 taking up the rest of the circle. That is a matter for the manufacturer and user of this device to determine. However, it is strongly recommended that the lock stop take up not more than 180 degrees, because that will allow the full remaining 180 degrees for the movement of the locking mechanism in a position of entire safety, so that the valve cannot become unlocked accidentally.

It will take at least half a turn on the tubing to unlock the valve. This is quite an improvement over other locking devices which require only the slightest lateral or rotary motion to lock or unlock them; and in this construction will be found one of the greatest safety features of our invention.

At one end of the curving lock stop 16 there is provided downwardly through the side wall of the locking ring 15 a vertically disposed keyway 17, which may well be made in the form of a rectangular slot.

The under face of locking ring 15 is made to provide an overhanging shoulder 19, extending beyond the outer walls of mandrel 8; and this shoulder comes to rest upon some supporting member in the assembly, such as the upper face of the valve seat body 11.

Housing the valve locking mechanism, and constituting a part thereof, there is provided spline casing or coupling 20. It is removably connected to the upper end of the valve seat body 11; and it completely encases the locking ring 15, which is attached to the top of mandrel 8. It also encases extension 16 above member 15.

Coupling 20 is so disposed about this ring that there is open space therebetween in the keyway 17. This space is sufficient to receive the projection of locking spline or key 22, which is fixedly carried inside of the spline coupling 20, and is so constructed as to be made a part of such coupling member.

The method of constructing and attaching the members 20 and 22 is of considerable importance in this invention. Such construction is made simple and clear by an examination of Figures IV to X, inclusive.

Fig. IV may be regarded as a plan view looking down upon a cross section of coupling 20 at about its middle part. The Figures IV to X, inclusive, are somewhat diagrammatic; and they are not shown to provide the threads or other means of attachment at the ends of the member 20. As a matter of fact, the member 20 is longer than these figures would indicate. Therefore, these figures may be considered as merely reflecting an intermediate section of the member 20.

In any event, there is provided through the side wall of the coupling 20 a rectangular cut, called a spline slot 21. This cut is made vertically along the side wall of the member 20; and it is designed to receive, and eventually hold, a very sturdy spline or key member 22.

The spline or key member 22 is carefully cut to fit snugly within slot 21; and it becomes important as to how deep it is inserted in this slot, how much of it extends inwardly beyond the inner face of member 20, and how firmly it is attached to the walls thereof.

The member 22 should be made from a square or rectangular bar of high grade steel; and it should be pressed into the slot 21 to such a depth that it is recessed considerably below the surface of the outer wall of the casing 20. Usually this depth is about half the thickness of the walls of the member 20.

In any event, the inner face of the spline 22 extends to an appreciable and considerable extent within the tubular member 20, sufficient to constitute a key or projection therein.

With the members 22 and 20 firmly held (as with jigs and clamps) in the position just indicated, the two are firmly welded together. First a welding seam should be run around the edges of the exposed section of the recess 21, particularly where the outer face of the spline meets the walls of the slot. After these members are firmly and immovably welded together, then the space left within the recess, on the outer wall of member 20, should be carefully built up with welding material until it is at least level with the walls of member 20, whereafter the welded surfaces are carefully ground and polished off, to fix a rounded contour on the same radius as that of the member 20. This construction is made plain in Figures VII and VIII.

When this operation is properly done and completed, it will be seen that the spline or key 22 will stand a terrific amount of stress without yielding. This is important. Lateral thrust will not in any way disturb it; and any shearing stress will fail to rupture it. Yet, this splendidly strong and dependable construction is a most inexpensive creation.

Low cost is a matter of great importance in our invention. Economy in manufacture, sturdiness and strength in construction and operation, and safety at all times, constitute a combination of great economic value. This device has a dependable character in operation. When it is locked it stays locked. It does not become accidentally disengaged.

It is well known that it is comparatively simple and easy to make machine cuts and slots, and the like, on the outside of a cylindrical or tubular member. However, it is equally well known that it is extremely difficult, expensive and highly undesirable to undertake to cut, or otherwise make by machining, a corresponding internal mating projection on the inner wall of a cylindrical or tubular member.

This invention does away with all of this uncertainty, this complexity and this extraordinary expense. The slot 21 may be cut cheaply and easily by machine operation; or the slot may be quickly made by the use of a cutting torch. The making of the key 22 is itself a simple matter, inasmuch as it consists of a simple rectangular bar or, in some instances, a square bar. Such a bar may be quickly cut with machine tools. Likewise it may be cheaply purchased in the open market, all ready for use and of appropriate size. In any event, it is simple and inexpensive to acquire.

The finished bar 22 is pressed into the recess 21 to the required distance, where it may be held firmly by simple jigs, made for the purpose. The welding operation thereafter is quick, effective, and inexpensive.

This key, constructed as we have disclosed, will handle and sustain tremendous loads on its end faces without any danger of shearing off; and it will transmit radial loads between the coupling 20 and the mandrel 8, with the greatest of safety. Strength and safety are matters of tremendous importance in oil field operations.

Having made plain the construction of the spline and its carrying coupling, and the union of the two, it should be apparent that a plurality of similarly constructed splines or keys may be made and integrated into a single spline coupling, whenever such arrangement may be considered necessary or desirable. Unusual safety, strength and economy will be present in a device equipped with plural splines.

In the use and operation of our invention, it is incorporated in a string of pipe, such as well tubing. Our valve assembly may thus be located in the well at any desired distance below the surface of the earth. Usually it is operated as a part of a tubing string enclosed in well casing, the latter extending from the ground surface to the bottom of the well.

Frequently it is necessary that fluids be circulated between the tubing and the casing, or between any string of pipe and the well bore.

It is easy to see, therefore, that with the device here disclosed the introduction of fluids into the well, or the removal of fluids therefrom, or the circulation of fluids therein, may be very easily accomplished.

The well tubing may be lowered into the well with our special valve standing wide open. It is first locked in open position, in the manner hereinabove set forth. When our duplex locking valve has reached the proper location in the well, then pumps at the ground level may force the circulation of fluid through this valve and into the casing. Likewise, the pressure of the pump may be used to force circulation from the casing through this valve and into the tubing. To state it simply: Any fluid may be caused to pass in either directly through this well valve, as a result of pump pressure, or of natural pressure within the well, such as gas pressure, hydrostatic pressure, or other force. The valve may be closed to prevent such passage.

When it is desired that this valve be closed, the tubing is rotated on-half turn, and then dropped. The key or spline will pass through the keyway and allow the duplex valve to completely close and entirely seal (all as has been made plain hereinabove).

Thus, it will be seen that our valve will not close accidentally, as the old type or conventional valves frequently do. The considerable distance which must be travelled by the spline in rotation before the valve can be unlocked is a great safety feature and prevents such accidental unlocking.

The rugged strength of the spline and key construction make certain that the locking members will carry tremendous loads without breaking; and this is so whether the stress be vertical or lateral.

Great assurance of leak-proof operation of the well valve is found in the plural sealing means heretofore disclosed. When this valve is closed it is well sealed and remains so, until designedly opened; and when it is opened, it is locked and remains so until intentionally unlocked.

The many conditions of well operation under which this double sealing and locking valve may be used will be at once self-evident to all well operators. Its strength, dependability and safety are the direct results of the design, construction and arrangement hereinabove indicated.

We claim:

1. In a telescopic locking device for use in oil wells, a tubular load-carrying outer member; an elongated slot initially vertically arranged through the side wall of said member intermediate its ends; an elongated bar of the approximate width and length of the slot, said bar being carried in said slot and projecting inwardly therefrom, the bar being fused to said member to effect a fluid-tight seal therebetween, the bar engaging the ends and sides of the slot; a mandrel slideably arranged within said member; a locking ring arranged about one end of said mandrel and affixed thereto; a keyway vertically arranged in the outer wall of the locking ring, capable of accommodating the movement therein of said bar; and a bar stop arranged in a position of elevation above the upper face of said ring, such stop having vertical edges spaced 180 degrees apart on the upper face of the ring, one of said edges being co-extensive with a side edge of the keyway to limit rotation of the bar to a movement of 180 degrees and also to guide the same into said keyway, such construction being adapted to allow the bar to be removed from the keyway and allowed to rest upon the upper face of the ring and against the bar stop.

2. A tubular coupling having a wall with a longitudinal four-sided slot initially extending through said wall intermediate its ends; a key substantially of the contour and size of the slot and fitted therein so as to contact all four sides of said slot; the inner surface of such key being projected from the inner side of the wall of the coupling; and the outer surface of the key being fused to the wall of the coupling.

3. A tubular coupling, having a wall with a longitudinal slot initially extending through said wall intermediate its ends; a key substantially of the contour and size of the slot and fitted therein; the inner surface of such key being projected from the inner side of the wall of the coupling; and the outer surface of the key being positioned below the outer surface of the wall of the coupling to thereby form a recess at the outer side of the slot; and the said recess being sealed and substantially filled by welding.

4. An elongated tubular load-carrying coupling, having a wall with an elongated slot initially arranged lengthwise through the wall of the coupling intermediate its ends; a load-carrying bar of substantially the same width and length as the slot and being so fitted therein as to partly project inwardly of the coupling wall and rest within the slot; and sealing material fusing together the bar and the wall of the coupling.

5. In a telescopic locking device for use in oil wells, a tubular load-carrying outer member; an elongated slot initially vertically arranged through the side wall of said member intermediate its ends; an elongated bar of the approximate width and length of the slot, said bar being carried in said slot and projecting inwardly therefrom, the bar being fused to said member to effect a fluid-tight seal therebetween, the bar engaging the ends and sides of the slot; a mandrel slideably arranged within said member; a locking ring arranged about one end of said mandrel and affixed thereto; a keyway vertically arranged in the outer wall of the locking ring, capable of accommodating the movement therein of said bar; and a bar stop arranged in a position of elevation above the upper face of said ring, such stop having vertical edges spaced apart on the upper face of the ring, one of said edges being co-extensive with a side edge of the keyway to limit rotation of the bar and also to guide the same into said keyway, such construction being adapted to allow the bar to be removed from the keyway and allowed to rest upon the upper face of the ring and against the bar stop.

References Cited in the file of this patent

UNITED STATES PATENTS

| Number | Name | Date |
|---|---|---|
| 249,228 | Dower | Nov. 8, 1881 |
| 334,919 | Wickizer | Jan. 26, 1886 |
| 1,080,273 | Fountain | Dec. 2, 1913 |
| 1,722,009 | Reardon | July 23, 1929 |
| 1,912,805 | Tilbury | June 6, 1933 |
| 2,027,783 | Martin | Jan. 14, 1936 |
| 2,156,395 | Klouman | May 2, 1939 |
| 2,323,989 | Fulkerson | July 13, 1943 |
| 2,337,429 | Tomlinson | Dec. 21, 1943 |
| 2,361,701 | Michaels | Oct. 31, 1944 |
| 2,397,473 | Crowell | Apr. 2, 1946 |
| 2,409,812 | Taylor | Oct. 22, 1946 |
| 2,450,822 | Baker | Oct. 5, 1948 |